UNITED STATES PATENT OFFICE.

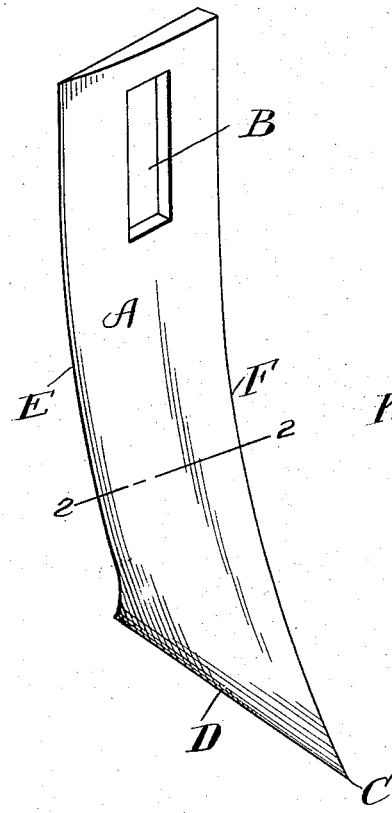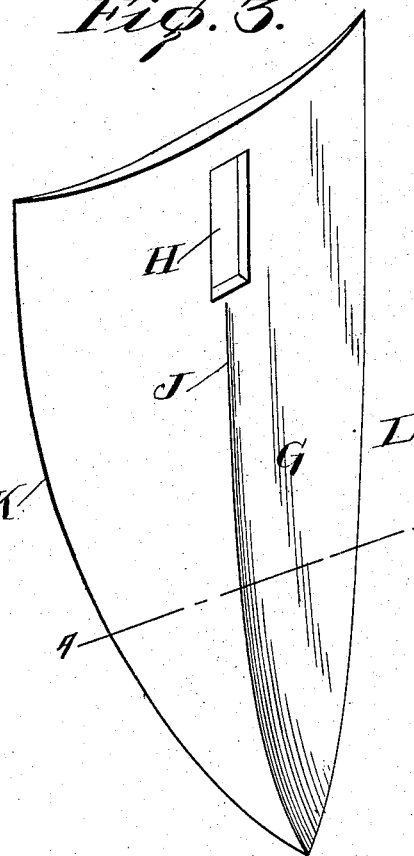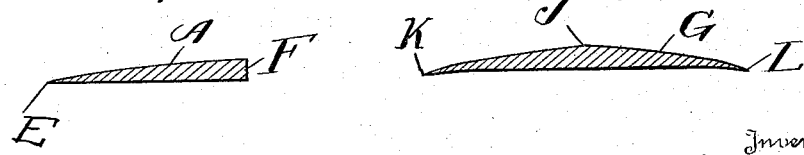

SEDGWICK M. JOHNSTON, OF LIBERTY, SOUTH CAROLINA.

PLOW-SHOVEL.

1,191,793. Specification of Letters Patent. Patented July 18, 1916.

Application filed May 21, 1914. Serial No. 840,046.

*To all whom it may concern:*

Be it known that I, SEDGWICK M. JOHNSTON, a citizen of the United States, residing at Liberty, in the county of Anderson, State of South Carolina, have invented certain new and useful Improvements in Plow-Shovels; and I do hereby declare the following to be a full, clear, and exact description of the invention, such as will enable others skilled in the art to which it appertains to make and use the same.

This invention relates to certain novel and useful improvements in shovels for plows, cultivators and similar agricultural implements.

As is well known, it is the general practice to make the body or blade of the ordinary plow shovel or cultivator shovel of uniform thickness throughout, the lower end of the shovel being, of course, beveled and pointed to form a sharp cutting edge. As this cutting edge or point of the shovel is worn through use, it becomes rounded and blunted, frequently to such an extent that instead of there being a point at the lower end of the shovel, the latter presents a curved blunt edge of substantially the same thickness as the body or blade of the shovel. The result is that the shovel is practically incapable of performing its intended functions and it must be removed from the shank and repointed and sharpened. Now, in repointing and sharpening such a shovel, it is customary and even usually necessary for the blacksmith to cut off a section from the lower end of the shovel, the cut being made along an inclined or beveled line so that a piece resembling a segment is removed from the lower end of the shovel. It will thus be evident that the life of the shovel is comparatively short, due to the cutting off and throwing away of substantial pieces as above mentioned. Consequently the old shovels must frequently be replaced with new ones, and this, in addition to the cost of repointing and sharpening such old shovels, results in a considerable item of expense to the farmer.

It is my purpose, therefore, in the present instance to provide a shovel of the type mentioned, which may be repointed and sharpened without cutting away a substantial piece of the blade or body of the shovel, and without requiring the blacksmith to expend as much time and labor on the work of repointing and sharpening, as is necessitated in performing the same operation upon the usual form of shovel. The result is that my shovel will last much longer than the ordinary shovel, and at the same time the expense incident to the frequent renewal of the shovel and the labor and waste involved in cutting and repointing the shovel is greatly reduced.

With the above recited objects and others of a similar nature in view, my invention consists in the construction, combination and arrangement of parts set forth in and falling within the scope of the appended claim.

In the accompanying drawings: Figure 1 is a perspective view of a single subsoil plow shovel made in accordance with my invention. Fig. 2 is a transverse sectional view taken on the line 2—2 of Fig. 1. Fig. 3 is a perspective view of a double plow shovel made in accordance with my invention. Fig. 4 is a cross sectional view thereof taken on the line 4—4 of Fig. 3.

Referring now to the accompanying drawings in detail, and especially to Figs. 1 and 2 thereof, wherein I have shown my invention as embodied in the form of a half or single plow shovel, the letter A designates the body or blade of the shovel, having an elongated slot B formed in the upper portion thereof, through which is designed to pass a stud or bolt by means of which the shovel is adjustably fastened to the usual shank of the plow. The extreme tip or point of the plow is indicated at C, while D indicates the cutting edge of the shovel, which extends obliquely from the relatively thin longitudinal side edge E of the shovel to the relatively thick longitudinal side edge F of such shovel, the point C being formed by the meeting of the cutting edge D with the side edge F. Now, in the practice of my invention, instead of making the body or blade of the shovel of uniform thickness throughout, I vary the thickness of the blade from one longitudinal side edge thereof to the other longitudinal side edge. By referring to Figs. 1 and 2 of the drawings it will be seen that the blade is thickest at the edge F, the blade then gradually tapering or thinning toward the opposite longitudinal side edge E. In practice I preferably make the body of the blade with the greatest maximum thickness at the edge F equal to at least three times the minimum thickness or that at the edge E. By so constructing the blade, it will be seen that when the point becomes blunted and rounded it is not necessary to cut off a section or portion of the blade adjacent the point, for the blade not being of uniform thickness throughout, the blacksmith by simply heating the lower portion of the blade and drawing or beating the metal from the thicker toward the thinner, or toward the cutting edge, may readily form the rough point which may afterward be dressed and sharpened. Thus I am enabled to save a great deal of material in the blade and obviate the shortening of the life of the blade by cutting segments or pieces therefrom. As stated, no cutting whatsoever of the blade is necessary, as the repointing and sharpening may be done by the blacksmith beating or drawing the metal from the thickened portion toward the thin cutting edge.

In Figs. 3 and 4 I have shown my invention as embodied in a double-pointed shovel, the body of which latter is indicated as an entirety by the letter G, and is provided with the usual slot H for the passage of a bolt for securing the shovel to the standard. In this case the center or median line of the shovel is indicated by the letter J, and in this case the blade is gradually thinned or tapered from such center toward both edges K and L thereof, the metal being relatively thickest at the center line and thinnest at the side edges. In repointing and sharpening this blade the same practice is followed, the metal being beaten or drawn from the center toward the point, and the side edges.

While in the present instance, I have shown my invention as embodied in two types of shovels, a half or single sub-soil plow shovel and a double shovel, I wish it to be understood that it is not limited in its useful application to these two particular types, as it may also be employed in connection with any of the other well known forms of shovels commonly used on plows.

What I claim is:

A plow shovel comprising a plate of malleable metal gradually tapering and thinning uniformly toward one of its vertical longitudinal side edges, said side edge being of uniform thickness throughout, said plate having a lower obliquely extending cutting edge portion forming a point at the thickest portion of the shovel, the construction and arrangement being such that the surplus metal at the thicker portion of the plow may be worked obliquely downward to the cutting edge of the body to repoint the shovel.

In testimony whereof, I affix my signature, in the presence of two witnesses.

SEDGWICK M. JOHNSTON.

Witnesses:
RICHARD B. CAVANAGH,
M. E. HARTLEY.

Copies of this patent may be obtained for five cents each, by addressing the "Commissioner of Patents, Washington, D. C."